United States Patent [19]
Krieger

[11] 3,864,170
[45] Feb. 4, 1975

[54] LOW CONDUCTIVITY THERMAL INSULATOR FOR THERMAL BATTERIES

[75] Inventor: Frank C. Krieger, Washington, D.C.

[73] Assignee: The United States of America as represented by the Secretary of the Army, Washington, D.C.

[22] Filed: Apr. 18, 1974

[21] Appl. No.: 462,056

Related U.S. Application Data

[63] Continuation-in-part of Ser. No. 249,583, May 2, 1972, abandoned.

[52] U.S. Cl. ............... 136/83 T, 136/166
[51] Int. Cl. .......................... H01m 21/14
[58] Field of Search ............. 136/83 T, 161, 166; 215/12 R, 12 A, 13 R; 220/9; 161/407, 45; 156/145

[56] References Cited
UNITED STATES PATENTS

| | | | |
|---|---|---|---|
| 1,898,977 | 2/1933 | Comstock | 161/407 X |
| 1,942,162 | 1/1934 | Campbell | 161/45 X |
| 2,331,450 | 10/1943 | Baum | 136/179 X |
| 2,757,840 | 8/1956 | Weissenberg et al. | 226/20.1 |
| 2,926,761 | 3/1960 | Herbert, Jr. | 161/68 X |
| 2,939,811 | 6/1960 | Dillon | 161/45 |
| 3,004,877 | 10/1961 | Simms et al. | 156/145 X |
| 3,424,622 | 1/1969 | Dechert | 136/161 |
| 3,558,363 | 1/1971 | Franklin | 136/83 T |
| 3,607,414 | 9/1971 | Kumano et al. | 136/83 T |
| 3,625,767 | 12/1971 | Clark et al. | 136/83 T |

Primary Examiner—John H. Mack
Assistant Examiner—C. F. Lefevour
Attorney, Agent, or Firm—Nathan Edelberg; Robert P. Gibson; Saul Elbaum

[57] ABSTRACT

A low thermal conductivity insulator for thermal power supplies comprising: (a) a thermal battery having components that react when heated and thereby produce electricity; (b) a porous thermal insulator surrounding the thermal battery in order to reduce heat losses therefrom; and (c) a gas having a thermal conductivity less than air and located in the pores of the insulator, and inert with respect to the components of the battery.

14 Claims, 4 Drawing Figures

LOW CONDUCTIVITY THERMAL INSULATOR FOR THERMAL BATTERIES

RIGHTS OF GOVERNMENT

The invention described herein may be manufactured, used, and licensed by or for the United States Government for governmental purposes without the payment to me of any royalty thereon.

This application is a continuation-in-part of Ser. No. 249,583, filed May 2, 1972, now abandoned.

BACKGROUND OF THE INVENTION

This invention relates generally to the provision of a low thermal conductive insulator for thermal power supplies and, more particularly, relates to a means for decreasing the thermal conductivity of the porous thermal insulators used in thermal power supplies.

Thermal power supplies are generally well known in the art. Thermal power supplies consist essentially of two electrodes and an electrolyte, the latter being a solid and inactive at normal temperature, but becoming liquid and active when subjected to heat. A typical example of such a thermal power supply can be found in U.S. Pat. No. 3,558,363. A distinct advantage of thermal power supplies is that they are capable of long storage and rapid activation. It is frequently necessary that such power sources be of minimum size and compatible with output requirements. Small size thermal power supplies are presently limited in lifetime by excessive heat losses due to the lack of adequate space for thermal insulation. Present methods of prolonging the lifetime of small thermal batteries include the use of additional thermal insulation and/or the use of larger electro-chemical cells which yield more heat during cooling. Both methods seem to produce final sizes larger than are acceptable in certain ordnance applications. A great need, therefore, exists for the development of a thermal battery having a more efficient thermal insulator without having to increase the size of the unit itself.

OBJECTS OF THE INVENTION

Accordingly, it is a primary object of the present invention to reduce the thermal conductivity of the thermal insulation of a thermal battery and thereby increase the effectiveness of a given amount of insulation and prolong the useful life of the power supply.

Another object of the present invention is to improve the temperature control in existing thermal batteries without increasing the size or space requirements for the insulation.

An additional object is to provide a method of increasing the efficiency of present thermal insulators in thermal batteries without extensive modification of existing design including the use of bulky and heavy insulation to protect the power supply cell from adverse temperatures encountered during use.

BRIEF SUMMARY OF THE INVENTION

Briefly, in accordance with the invention, a low conductivity thermal insulator for thermal power supplies is provided which comprises: (a) a thermal battery having components that produce electricity when heated; (b) a porous thermal insulator surrounding the thermal battery in order to reduce heat losses therefrom; and (c) at least one gas having a thermal conductivity less than air and located in the pores of the insulation and being inert with respect to the components of the battery.

The gas, having a thermal conductivity below that of air increases the insulation capabilities even in the presence of large amounts of gas contaminants normally evolved during battery operation without alteration of existing designs or size requirements of the power supplies themselves. Optional ingredients including oxidizing agents, desicating agents and gettering agents can also be placed in the power supply to effectively reduce the emission of any hydrogen or other gas contaminants from the thermal power supply.

DETAILED DESCRIPTION OF THE INVENTION

Figure 1:
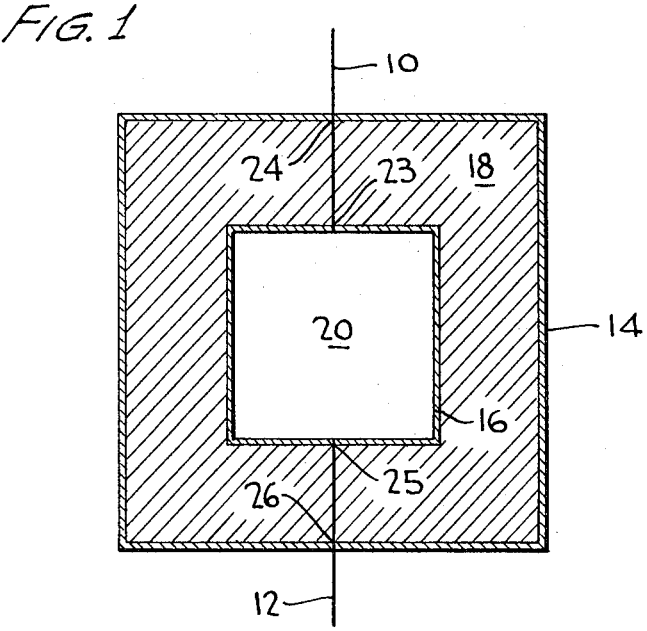
Figure 2:
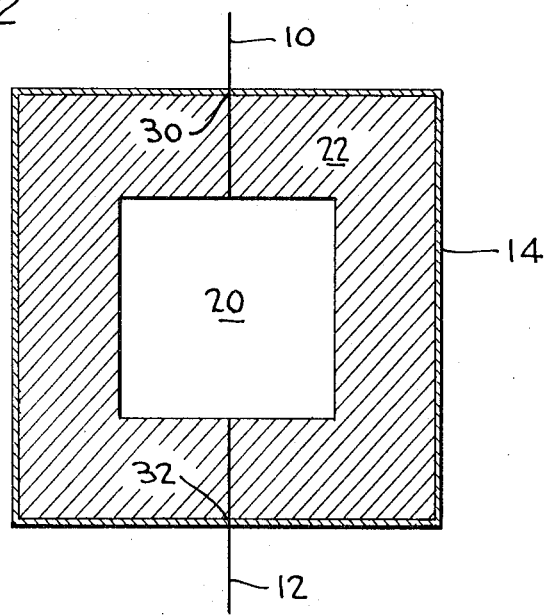

The invention will be better understood and objects other than those set forth above will become apparent when consideration is given to the description when read in conjunction with the accompanying drawings, wherein:

FIG. 1 is a cross sectional schematic representation of a typical thermal power supply unit that may be modified in accordance with a preferred embodiment of the present invention; and FIG. 2 presents another embodiment of the present invention.

FIG. 1 illustrates at 10 and 12 electrical leads that are connected to the active components 20 of the thermal cell. The actual operation of such cells is well known and need not be discussed in detail for the purpose of understanding the present invention. The active components 20 are surrounded by a conventional thermal insulation material 18, e.g., asbestos or fiberglass wool. The entire unit is preferably contained within a gas tight metal container 14 which is preferably a cold rolled steel case. Basically, the present invention is directed towards reducing the thermal conductivity of the porous thermal insulation 18 (e.g. asbestos paper or fiberglass wool) by placing a low thermal conductivity gas in the pores of the insulation. The low thermal conductivity gas is placed into the insulation material during assembly of the battery and contained within during storage by hermetic seals 24 and 26 which are preferably glass metal hermetic feedthrough seals, that are used to prevent the introduction of moisture from the atmosphere. Because many thermal batteries evolve high thermal conductivity gases (e.g., about 80% hydrogen and small amounts of carbon monoxide, carbon dioxide, oxygen and nitrogen) from battery components (i.e. from pyrotechnic materials, from the primer or electric match used for ignition and possibly from contaminants introduced during soldering) upon activation and during their operation, it is particularly desirable to exclude the hydrogen gas from the insulation 18. This is accomplished by placing a gas tight metal container 16, having seals 23 and 25, between the components 20 that evolve hydrogen and the thermal insulation 18. Container 16 is preferably a stainless or steel cold rolled steel jacket at least 0.010 inches thick.

Since some gas contaminants can still enter into the battery insulation by diffusion or outgassing during storage, at least one gas having a thermal conductivity less than air is placed within the pores of the thermal insulation 18. Thus any gas contaminants having a high thermal conductivity (e.g., hydrogen) and present in the pores of the insulation will be mixed with a sufficient amount of at least one low thermal conductivity gas. Because gas conductivity does not change greatly with pressure after one atmosphere (760 mm Hg) is reached, the final gas mixture in an operating battery could be made very rich in low conductivity gas by adding at least one low thermal conductivity gas under several atmospheres of pressuring during the construction of the battery. The final gas mixture would then have a low thermal conductivity because of the low percentage of hydrogen present. Further, the excess of low thermal conductivity gas present would dilute any other gas contaminants which may enter the battery insulation by diffusion or outgassing during storage, and thereby insure a low thermal conductivity atmospher for long storage times (5 to 20 years shelf life are typical) even in the presence of such contaminants.

The low thermal conductivity gases that are used in the practice of this invention include those gases having a thermal conductivity below that of air which (in cgs units) is $0.583 \times 10^4$ at 0° C. or $0.922 \times 10^4$ at 218° C. It is also important that the low thermal conductive gases used in the practice of the invention be inert with respect to the active components of the electrochemical cell including gettering agents and not liquefied at pressures and temperatures (from about −55°C to about 600°C. and from 1 to 20 atmospheres) normally encountered during storage and actual use of the battery. Particularly useful gases include argon, krypton, xenon, and halogenated lower alkanes (e.g., $CF_4$ and $CF_3-CF_3$).

The amount of low thermal conductivity gas to be employed in the practice of this invention is generally an effective amount for reducing the thermal conductivity of all gases present in the insulator so that the battery will have a long storage life which is preferably at least about 5 years, and more preferably, 20 years. Preferably, the amount of low thermal conductivity gas required for the practice of this invention is an amount sufficient to maintain the operational temperature of the battery for 3 or more minutes.

According to a preferred embodiment of this invention, it is particularly advantageous to evacuate the porous thermal insulation 18 during assembly and maintain the vacuum during storage with the aid of a gettering agent. In addition the gettering agent is useful for removing any contaminating gases that might be introduced into the insulating material and thereby providing an even lower thermal conductivity in the insulation than the use of low conductivity gases alone together with an improvement in the insulating properties of the thermal insulator.

In this embodiment, however, the lack of any low thermal conductivity gas may require excessive amounts of gettering agent because even small amounts of gas contaminants would increase the insulation conductivity markedly since they are not diluted with any low-conductivity gas.

Gettering agents useful in the practice of this embodiment of the invention are those well-known in the art and useful for such contaminants as air, hydrogen, carbon monoxide, carbon dioxide, nitrogen and oxygen. The gettering mechanism can be essentially physical, involving adsorption or absorption of the gas, or formation with the gas of relatively unstable compounds, although some gettering agents will form stable compounds with the contaminating gases. Preferred gettering agents include barium, misch metal, uranium and thorium.

The amount of gettering agent employed is an effective amount for removing the contaminating gas.

The minimum amount of gettering agent used is dependent upon the particular gettering agent employed. For example, a minimum of 0.00869 grams of barium are required to remove 1 cubic centimeter of hydrogen at standard temperature and pressure (STP). Similarly, 0.0119 grams of misch metal are required for removal of 1 cubic centimeter of hydrogen at STP; 0.0354 grams of uranium are required for 1 cubic centimeter of hydrogen at STP; and 0.0142 grams of thorium are required for 1 cubic centimeter of hydrogen at STP.

According to still another further embodiment of this invention, hydrogen gas can also be excluded from the thermal insulation by effective amounts of an oxidizing agent placed in the power supply and otherwise inert with respect to the low thermal conductivity gases. Particularly preferred oxidizing agents include $CuO$, $FeO$, $Ag_2O$, $SnO_2$ and $ZnO$. The particular amount of oxidizing agent employed can largely be determined by the particular oxidizing agent used and the amount of contaminating gas (i.e., hydrogen) that must be removed. For example, the following amounts of each of the following oxidizing agents are required to remove 1 cubic centimeter of hydrogen gas:

| | |
|---|---|
| $CuO$ | 0.00355 grams |
| $FeO$ | 0.00321 grams |
| $Ag_2O$ | 0.0104 grams |
| $SnO_2$ | 0.00336 grams |

When an oxidizing agent is employed, water is formed in the redox reaction. The water formed can be removed by providing an effective amount of a conventional dessicating agent within the insulation material. The following represents particularly suitable dessicating agents that can be employed in the practice of the invention together with the requisite amount (in grams) of the particular dessicant to remove 1 cubic centimeter of water at STP:

| | |
|---|---|
| $Mg(ClO_4)_2$ | 0.00166 |
| $CaSO_4$ | 0.00304 |
| $Ba(ClO_4)_2$ | 0.00500 |
| $LiCl$ | 0.00189 |
| $CaO$ | 0.00250 |
| $BaO$ | 0.00685 |

While the above list represents some rather preferred dessicants useful in the practice of this invention, it is noted that several types of conventional dessicating agents are usually available for the removal of water and useful in the practice of this invention including:

A. Removal by water of crystallization, e.g., $Mg(ClO_4)_2$, $CaSO_4$ and $Ba(ClO_4)_2$;

B. Removal by water of hydroxylation, e.g., $P_2O_5$, $BaO$ and $CaO$;

C. Removal by zeolitic water present in the molecular crystal lattic, e.g., "activated" aluminum oxide and silica gel; and D. Removal by water of deliquescence, e.g., $LiCl$ and $CaCl_2$.

Figure 3:
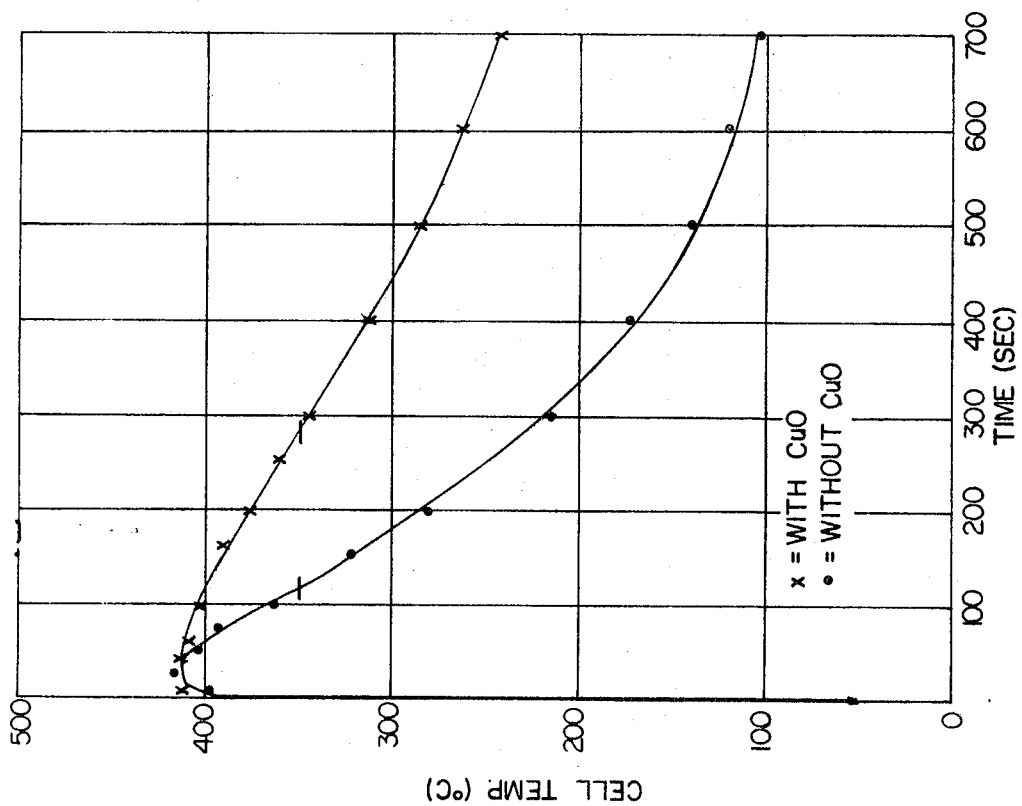

For purposes of determining the effect of incorporating a $CuO$ oxidizing agent into a simulated thermal battery, reference is made to FIG. 3 which illustrates an experimental curve showing the effect of $CuO$ on cell temperature. When no $CuO$ was added to the insulator, the unit cooled to 350° C. (the approximate minimum operating temperature) in 115 seconds, but with CuO present, an identical unit remained above 350° C. for 275 seconds.

Copper discs were used to simulate the thermal cells. The simulated batter excluding the outer case, was a right circular cylinder 1.77 inches long and 1.84 inches in diameter. The thermal insulation was glass fiber paper which comprised 90 percent air and 10 percent glass fibers by volume. No inner steel can was used to separate the gases evolved from the pyrotechnic material away from the thermal insulation. The total mass of pyrotechnic material used was 33 grams which evolved about 600 cm$^3$ (STP) of hydrogen gas. The total pressure within the simulated battery, calculated from this amount of evolved gas was about 25 atmosphers (368 P.S.I.) after allowing for heating of the activated battery components.

A total of 2.13 grams of CuO is required to react with this amount of hydrogen according to the equation $CuO + H_2 \rightarrow Cu + H_2O$. In the experimental units, about 5.6 grams of CuO were used to insure an excess of CuO was available. The outer case was hermetically sealed to prevent any escape of gas. The thermal conductivity of the insulation measured by the curve in FIG. 3 showed that essentially all of the hydrogen was removed by CuO. The $H_2O$ formed from the reaction remained as water in the battery because no reducing agents were present to reduce the water back to hydrogen. This water might have been removed by adding dessicants but this was not done.

Figure 4:
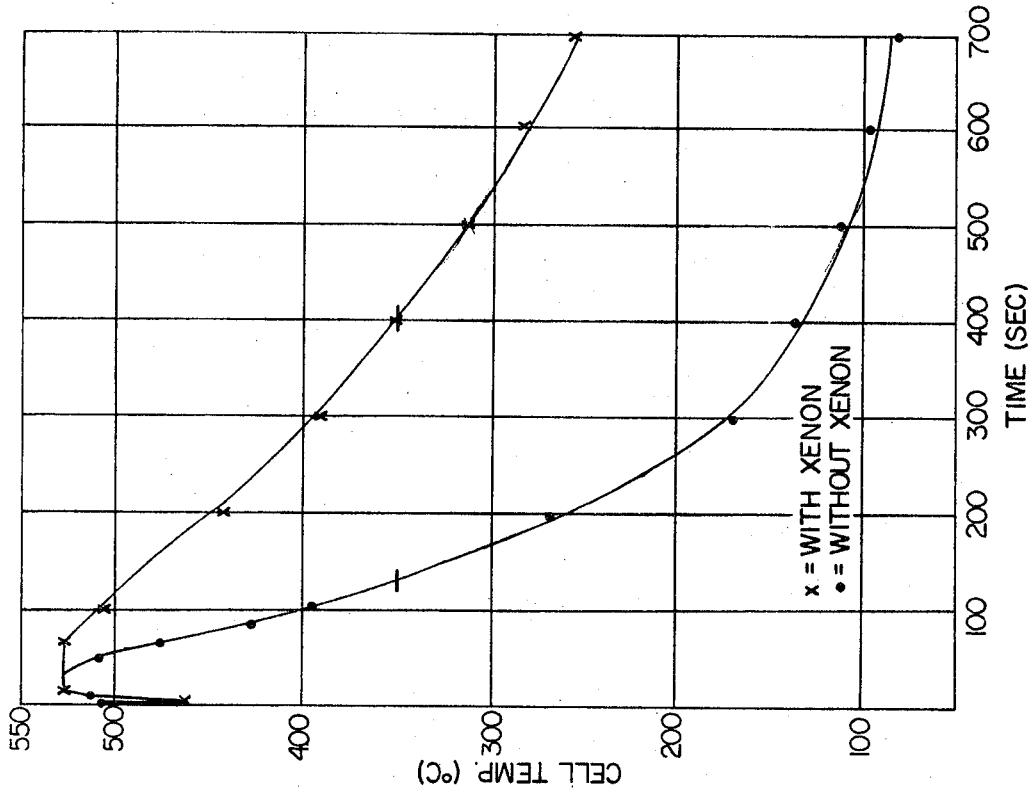

FIG. 4 shows the effect of adding xenon to the battery. Identical units remained above 350° C. for 130 seconds with no xenon and for 400 seconds with xenon present. The test unit for this experiment is an actual operating battery and is much smaller than the one discussed in connection with FIG. 3. The length is 0.73 inches (1.81 cm) and the diameter is 0.78 inches (1.97 cm.) excluding the battery case which is cold rolled steel that is 0.019 inches thick. The pyrotechnic material was 88 percent Fe and 12 percent $KClO_4$ which was pelletized by pressing the powdered mixture at about 18,000 PSI. This pyrotechnic material evolves much less gas than most other pyrotechnics used in thermal batteries. A total of about 3.8 grams of this material was used and the total $H_2$ gas evolved from all the battery components was about 5 cm$^3$ (STP), which would require about 18 mg. of CuO according to the equation $CuO + H_2 \rightarrow Cu + H_2O$. A total of 200 mg. CuO was used to insure a large excess of CuO.

Unfortunately, the pyrotechnic material contains a large excess of unreacted Fe which reacts with the water formed by the reaction (2) below to form FeO and $H_2$. Thus, the reaction sequence:

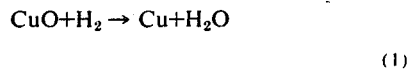

(1)

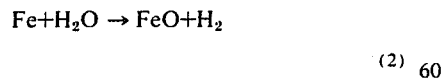

(2)

is repeated until the CuO is used up, after which the gas present in the insulation will be hydrogen. To stop this cyclic reaction, water formed by equation (1) could be removed by dessicants such as those mentioned above, but this was not done experimentally.

The curve marked "without xenon" in FIG. 4 is a time-temperature curve for the cell of a typical unit wherein CuSb is the heat reservoir and the outer battery case is sealed to prevent any escape of gas evolved from the pyrotechnic materials. When the experimental heat loss rate is compared with the calculated heat loss rate, it becomes apparent that sufficient hydrogen was present during operation to double the heat loss rates over those obtained in a pure air atmosphere.

The curve marked "with xenon" in FIG. 4 is a curve for a unit identical to the unit discussed above except that: (1) ignition was by a hot wire instead of by a M42G primer, and (2) the battery case was vented and the surrounding atmosphere was xenon. The percentage of xenon actually present in the insulation of the operation unit was calculated to be about 80 percent by volume from the cooling curve. The time to cool to 350° C (the approximate minimum cell-operating temperature) was increased from about 130 seconds for the first unit to almost 400 seconds from the unit with xenon.

To obtain an 80 percent by volume xenon atmosphere in a sealed battery, xenon would have to be added at a pressure of about 7 atmospheres (103 PSI) in this application. Gas pressures in the operating battery would be almost 15 atm. after allowing for heating of battery components. These gas pressures could be reasonably maintained and the effect of the increased pressure on the insulation conductivity would be small. Most efficient use, however, would result from the use of oxidizing and dessicating agents and/or gettering agents to reduce the amount of gas contaminantions to a minimum and reduce the pressure of xenon required.

I wish it to be understood that I do not desire to be limited to the exact details of construction shown and described, for obvious modifications will occur to a person skilled in the art.

I claim:

1. A low thermal conductive insulator for thermal power supplies, comprising, in combination:
   a. a thermal battery having electrodes and at least one solid electrically non-conducting material at normal storage temperature but becoming an electrolyte in the molten state and means contained in the battery for supplying heat to melt said electrolyte causing said cell to become functionally active to produce electric current, said means also causing high thermally conductive gases to be evolved and capable of reducing the efficiency of a porous thermal insulator said battery being in a gas tight metal container;
   b. a porous thermal insulator surrounding said thermal battery to reduce heat losses therefrom; and
   c. at least one low thermal conductive inert gas located within the pores of said insulator for further reducing the heat losses from said thermal battery, said gas having a thermal conductivity below that of air, and not liquefied at normal operating temperatures of said thermal battery.

2. The thermal cell of claim 1 wherein said gas is argon, krypton, xenon, $CF_4$, or $CF_3$-$CF_3$ or mixtures thereof.

3. The thermal cell of claim 2 further comprising a gas tight metal container that separates said thermal battery and said thermal insulator.

4. The thermal cell of claim 3 wherein said thermal insulator is asbestos paper or fiberglass wool.

5. The thermal cell of claim 3 further comprising an effective amount of an oxidizing agent located in said thermal insulator for the removal of hydrogen gas.

6. The thermal cell of claim 5 wherein said oxidizing agent is CuO, FeO, $Ag_2O$, $SnO_2$ or SnO.

7. The thermal cell of claim 5 further comprising a desiccant located in said thermal insulator.

8. The thermal cell of claim 7 wherein said desiccant is $Mg(ClO_4)_2$, $CaSO_4$, $Ba(ClO_4)_2$, LiCl, CaO, BaO, $CaCl_2$, silica gel or activated aluminum oxide.

9. The thermal cell of claim 3 further comprising a gettering agent in an amount effective to remove contaminating gases from said insulator, said gettering agent being inert to said low thermal conductive gas.

10. A method of reducing the thermal conductivity in the porous thermal insulation that surrounds the active components of a thermal battery, comprising the steps of:
   a. placing a gas tight metal container between said active components of said thermal battery and said thermal insulation to reduce the amount of high thermally conductive contaminants entering said insulation; and
   b. introducing an effective amount of low thermal conductivity inert gas having a thermal conductivity below that of air into the pores of said thermal insulation to reduce the effect of any high thermally conductive gases not excluded by step (a).

11. The method of claim 10 further comprising the step of introducing an oxidizing agent and a desiccating agent into the pores of said thermal insulation.

12. The method of claim 9 wherein said low thermal conductivity gas is argon, krypton, xenon, $CF_4$ or $CF_3$-$CF_3$.

13. The method of claim 10 further comprising the steps of:
   a. initially evacuating the porous thermal insulation during the assembly of said battery; and
   b. maintaining said vacuum during storage and operation by means of a gettering agent, said gettering agent removing gas contaminants entering during storage and upon heating the battery components of activation.

14. The method of claim 11 wherein said gettering agent is barium, misch metal, uranium or thorium.

* * * * *